US007515989B2

(12) United States Patent
Yoshizaki

(10) Patent No.: US 7,515,989 B2
(45) Date of Patent: Apr. 7, 2009

(54) GOODS SALES MANAGEMENT SYSTEM AND GOODS SALES MANAGEMENT METHOD

(75) Inventor: Wataru Yoshizaki, Tokyo (JP)

(73) Assignee: Sega Corporation, Tokyo (JP)

( * ) Notice: Subject to any disclaimer, the term of this patent is extended or adjusted under 35 U.S.C. 154(b) by 61 days.

(21) Appl. No.: 10/570,203

(22) PCT Filed: Aug. 4, 2004

(86) PCT No.: PCT/JP2004/011172

§ 371 (c)(1),
(2), (4) Date: Mar. 2, 2006

(87) PCT Pub. No.: WO2005/024737

PCT Pub. Date: Mar. 17, 2005

(65) Prior Publication Data

US 2007/0050082 A1 Mar. 1, 2007

(30) Foreign Application Priority Data

Sep. 2, 2003 (JP) ............................ 2003-309574

(51) Int. Cl.
*G06F 17/00* (2006.01)

(52) U.S. Cl. ................... 700/238; 221/150 R; 700/244; 700/241; 700/236; 700/240

(58) Field of Classification Search ................. 700/238, 700/240, 241, 244; 221/150 R
See application file for complete search history.

(56) References Cited

U.S. PATENT DOCUMENTS 6,012,834 A * 1/2000 Dueck et al. ................ 700/238
6,167,327 A * 12/2000 Broker et al. ............... 700/238
6,230,150 B1 * 5/2001 Walker et al. ............... 700/238
6,397,193 B1 * 5/2002 Walker et al. ................. 705/16

FOREIGN PATENT DOCUMENTS

JP 2001-53903 2/2001

* cited by examiner

*Primary Examiner*—Gene Crawford
*Assistant Examiner*—Timothy R Waggoner
(74) *Attorney, Agent, or Firm*—McGinn IP Law Group, PLLC

(57) ABSTRACT

A goods sales management system has a plurality of goods vending machines 1provided with containers for storing a plurality of goods and a vending machine management apparatus 80 connected to each of the plurality of the goods vending machines via a communication line 70. The goods vending machine 1 has a time adjustment management unit 64 for making a time managed by itself coincide with a time managed by the vending machine management apparatus 80, an information management unit 63 for managing sales information such as number of sold goods and a sales time, a transmission time setting unit 66 for setting a transmitting time when the sales information is transmitted to the vending machine management apparatus 80, and an information transmitting unit 65 for transmitting the sales information to the vending machine management apparatus 80 at the set transmission time. The information management unit 63 manages temperature information of an temperature sensor 51 for detecting temperature in the container, and changes a sales price of goods to the price controlled by the vending machine management apparatus 80. The information transmitting unit 65 transmits information of the temperature sensor also as well as the sales information to the vending machine management apparatus 80.

19 Claims, 5 Drawing Sheets

GOODS SALES MANAGEMENT SYSTEM AND GOODS SALES MANAGEMENT METHOD

TECHNICAL FIELD

The present invention relates to a goods sales management system and a goods sales management method comprising or using a plurality of goods vending machines provided with a container capable of storing a plurality of goods and a vending machine management apparatus connected to the goods vending machines via a communication line for managing the goods vending machines.

BACKGROUND ART

As is well known, the conventional goods vending machines include a retail vending machine for selling toys, confectionary or dolls contained in a capsule (hereinafter referred to as a "retail vending machine"). The retail vending machine has a storing portion for containing a plurality of capsules storing goods, an ejection port provided below the storing portion for ejecting the capsules, a handle, which is rotated when ejecting the capsules contained in the storing portion into the ejection port, provided between the storing portion and the ejection port, and a money throw-in port for receiving money.

Because the retail vending machines meet a small installation space, and are capable of operating without an electric supply, these retail vending machines are usually set at surplus spaces in a shopping center, or at stores or places where a manager of sales does not always stay.

As each retail vending machine is formed as one sales unit, the proceeds are individually stored in each vending machine. Therefore, the manager must collect the proceeds one by one after unlocking each safe of the vending machine at each time of collecting the proceeds, so that such collecting works are very troublesome. In order to avoid such troublesome collecting works, there appeared some different types of retail vending machines with the other types of structures in which a plurality of vending machines are formed as one sales unit, and a single money throw-in-port is provided to receive money from the plurality of vending machines. These vending machines are provided with a switch section corresponding to each retail vending machine in the vicinity of the money throw-in port, and through operating the switch section, the same effects can be obtained as the money is thrown into each vending machine.

In each retail vending machine, the manager of the vending machines must collect the proceeds in each vending machine in accordance with the predetermined collecting schedule, even though there are few sales of the goods. If there are busy days during the collecting schedule, it is likely to happen that the money throw-in port is too overfilled for the vending machines to sell the goods. Accordingly, the manager must collect the proceeds in accordance with the shorter collecting schedule, therefore efficiency for collecting the proceeds is further lowered.

Then, Japanese Patent Application Laid-Open No.: 2001-53903 (see Page 2, FIG. 6) proposes a vending machine which can more efficiently perform the collection of the proceeds, in which a radio communication terminal such as a cellular phone is provided in the vending machine. Various information of the vending machine including stock quantity and proceeds is formed as voice information, which is communicated to a manager by means of the radio communication terminal through a phone line.

DISCLOSURE OF THE INVENTION

Problems to be Solved by the Invention

In the conventional vending machines, as a manager does not always stay near a vending machine, only goods which are not apt to deteriorate can be stored in a storing portion of a retail vending machine. This is because there may happen the case where a quality of the goods is deteriorated due to changes of temperature or humidity in the storing portion if the storing portion for containing the goods breaks down or is damaged. Accordingly, the range of choices for the goods to be stored is limited. Also, the conventional retail vending machine can not properly respond to the deterioration of the goods due to rapid changes of the temperature, or the like, and therefore it may result in selling the deteriorated goods. Further, according to the conventional retail vending machines, a change in sales price is limited only when supplying the goods or collecting the proceeds, therefore it is very difficult to set the sales price in consideration of quality maintaining period of the goods. In other words, there appears a problem where it is very difficult to decide the sales price so as to reflect demands of customers.

The present invention is proposed to address the foregoing problems, and provided with the goods sales management system having a plurality of goods vending machines and a vending machine management apparatus connected to the goods vending machines via a communication line. It is thus an object of the present invention to provide a goods sales management system and a goods sales management method for making it possible to control each quality of a plurality of goods stored in the storing portion of the retail vending machine and to set the price in consideration of the quality thereof.

Means for Solving the Problems

The invention of claim 1 is characterized by a goods sales management system having a plurality of goods vending machines provided with a container for storing a plurality of goods, respectively, and a vending machine management apparatus for controlling the plurality of goods vending machines, the vending machine management apparatus being connected to each of the plurality of goods vending machines through a communication line, wherein the vending machine management apparatus manages time as time information which is transmittable to each of the plurality of goods vending machines. Each of the goods vending machines comprises: time adjustment management means (for example, a time adjustment management unit 64 of the present embodiment) for managing time as time information and making the managed time coincide with the time information managed by and transmitted from the vending machine management apparatus; information management means (for example, an information management unit 63 of the present embodiment) for managing sales information including at least one of a kind and number of goods as delivered from the container, a sales price, and a sales time; transmission time setting means (for example, a transmission time setting unit 66 of the present embodiment) for setting a transmission time when the sales information is transmitted to the vending machine management apparatus; and information transmitting/receiving means (for example, an information transmitter/receiver unit 65 of the present embodiment) for transmitting the sales information managed by the information management means to the vending machine management apparatus at the set transmission time. In such a system, the goods vending machine transmits the time information managed by itself as well as the sales information to the vending machine management apparatus through the information transmitting/receiving means, but, on the other hand, the vending machine management apparatus transmits the time information managed thereby to the goods vending machine as a transmitter of the sales information when receiving the sales information, so that the time adjustment management means of the goods vending machine makes the time managed by itself coincide with the time information transmitted from the vending machine management apparatus.

The invention of claim 2, in the goods sales management system according to claim 1, is characterized in that each of the goods vending machines further comprises detecting means(for example, a temperature sensor 51 of the present embodiment) for detecting at least either one of a temperature or a humidity in the container of the goods vending machine, wherein the sales information transmitted to the vending machine management apparatus includes information of the temperature or humidity detected just before the transmission of the sales information.

The invention of claim 3, in the goods sales management system according to claim 1 or 2, is characterized in that the vending machine management apparatus further comprises price setting means (for example, a price setting unit 82 of the present embodiment) for setting a sales price of each goods sold by each of the plurality of goods vending machines, wherein the vending machine management apparatus transmits information of the sales price controlled by the price setting means to the goods vending machine as the transmitter of the sales information when receiving the sales information, and the information management means of the goods vending machine changes the sales price managed by itself to the sales price controlled by the price setting means.

The invention of claim 4, in the goods sales management system according to any one of claims 1 to 3, is characterized in that the containers of the goods vending machine are structured to be capable of separately containing a plurality of kinds of goods every container. Further, each of the goods vending machine further comprises a sales management unit for delivering the desired goods in accordance with a selecting operation of desired kinds of goods by a customer after receiving paid money.

The invention of claim 5 is characterized by a goods sales management method which uses a goods sales management system having a plurality of goods vending machines provided with a container for storing a plurality of goods, respectively, and a vending machine management apparatus connected to each of the plurality of goods vending machines through a communication line for controlling the plurality of goods vending machines, and through the method, sales information of goods in the plurality of goods vending machines is managed. The method comprises the steps of: transmitting the sales information, which includes at least one of a kind and number of goods as delivered from the container, a sales price, and a sales time, from the goods vending machine to the vending machine management apparatus at a predetermined transmitting time; transmitting time information managed by the vending machine management apparatus from the vending machine management apparatus to the goods vending machine as a transmitter of the sales information when receiving the sales information; and making time, which is managed by the goods vending machine, coincide with the time information transmitted from the vending machine management apparatus.

The invention of claim 6 is characterized by a goods sales management method which uses a goods sales management system having a plurality of goods vending machines provided with a container for storing a plurality of goods, respectively, and a vending machine management apparatus connected to each of the plurality of goods vending machines through a communication line for controlling the plurality of goods vending machines, and through the method, sales information of goods in the plurality of goods vending machines is managed. The method comprises the steps of: setting a sales price of goods by the vending machine management apparatus in accordance with the sales information of goods, which is transmitted from the goods vending machine, and then transmitting the set sales price from the vending machine management apparatus to the goods vending machine as a transmitter of the sales information; changing a sales price managed by the vending machine to the set sales price transmitted from the vending machine management apparatus; transmitting a change-completion notice of the sales price from the goods vending machine to the vending machine management apparatus; transmitting time information managed by the vending machine management apparatus from the vending machine management apparatus to the goods vending machine as a transmitter of the change-completion notice when receiving the change-completion notice; and making time, which is managed by the goods vending machine, coincide with the time information transmitted from the vending machine management apparatus.

The invention of claim 7, in the goods sales management system according to any one of claims 1 to 4, is characterized in that the time information transmitted from the vending machine management apparatus to the goods vending machine, if there is a time difference between each time of places where the vending machine management apparatus and the goods vending machine are arranged, respectively, includes the time difference.

The invention of claim 8, in the goods sales management method according to claim 5 or 6, is characterized in that the time information transmitted from the vending machine management apparatus to the goods vending machine, if there is a time difference between each time of places where the vending machine management apparatus and the goods vending machine are arranged, respectively, includes the time difference.

According to the goods sales management system of the present invention defined by claim 1, the sales information of each of a plurality of goods vending machines is transmitted to one vending machine management apparatus so that all the sales information of goods can be intensively managed by the vending machine management apparatus. Thus, each sales condition of goods can be easily recognized from the sales information. In the case that a sales time when the goods was sold is included in the sales information, it can be determined as to whether the goods was sold within the quality maintaining period by knowing the time when the goods were stored and the time when the goods were sold, so that the quality control of goods becomes possible. As a result, the goods requiring the quality control also can be stored in the goods vending machine, so that the range of choices for the goods to be stored can be increased. Further, as the sales time is included in the sales information, a demand of goods stored in the goods vending machine can be grasped through the time when the goods was sold. As a result, it becomes possible to estimate the good timing for the collection of the proceeds, and therefore to perform the collection of the proceeds more effectively, comparing with the collection of the proceeds under the predetermined collection schedule. Since the goods sales management system of the present invention makes the time managed in the goods vending machine coincide with the time controlled by the vending machine management apparatus, the transmission time of the sales information transmitted from the goods vending machine is precisely controlled. Therefore, in the case that the slightly different time for transmitting the sales information from the plurality of the goods vending machines to the vending machine management apparatus is set, the situation that the sales information is transmitted simultaneously can be prevented due to the deviation of these set time in advance.

According to the goods sales management system of the present invention defined by claim 2, each of the goods vending machines further is provided with detecting means for detecting at least either one of a temperature or a humidity in the container thereof. Information of the temperature or humidity detected just before the transmission of the sales information is included in the sales information transmitted to the vending machine management apparatus. In such a way, since the temperature and humidity in the container is managed, the quality control of goods stored in the container can be performed more adequately.

According to the goods sales management system of the present invention defined by claim 3, the vending machine management apparatus is provided with price setting means for setting a sales price of goods, wherein the vending machine management apparatus transmits information of the sales price controlled by the price setting means to the goods vending machine as the transmitter of the sales information when receiving the sales information, and after receiving the information of sales price, the goods vending machine changes the sales price managed by itself to the sales price controlled by the price setting means. Thereby, the sales price of goods sold by the goods vending machine can be freely set in accordance with the sales information. That is, the sales price of goods can be set in consideration of, for example, poor sales or a deterioration of the goods. Therefore, it is possible to set the sales price so as to meet customer's demands.

According to the goods sales management system of the present invention defined by claim 4, the containers of the goods vending machine are structured to be capable of separately containing a plurality of kinds of goods every container. Further, each of the goods vending machine includes a sales management unit for delivering the desired goods through goods ejecting means in accordance with a selecting operation of desired kinds of goods by a customer after receiving paid money, so that a plurality of goods vending machines can be structured as one sales unit so as to allow a money throw-in port to be concentrated. Thus, it will not be necessary to collect the proceeds for every one of goods vending machines, that is, the effort of collection of the proceeds can be reduced. In addition, a surplus space can be created in the goods vending machine through concentrating the money throw-in portion of the goods vending machine into one spot to improve the degree of freedom of design for the goods vending machine.

According to the goods sales management method of the present invention defined by claim 5, the sales information, which includes at least one of a kind and number of goods as delivered from the container, a sales price, and a sales time, is first transmitted from the goods vending machine to the vending machine management apparatus at a predetermined transmitting time. Next, the time information managed by the vending machine management apparatus is transmitted from the vending machine management apparatus to the goods vending machine as a transmitter of the sales information when receiving the sales information. Last, the goods vending machine makes time managed by itself coincide with the time information transmitted from the vending machine management apparatus after receiving it. Thereby, the sales condition of goods can be accurately recognized from the sales information. Moreover, in the case that a sales time when the goods was sold is included in the sales information, it can be determined as to whether the goods was sold within the quality maintaining period by knowing the time when the goods were stored and the time when the goods were sold, so that the quality control of goods becomes possible. As a result, the goods requiring the quality control also can be stored in the goods vending machine, so that the range of choices for the goods to be stored can be increased. Further, as the sales time is included in the sales information, a demand of goods stored in the goods vending machine can be grasped through the time when the goods was sold. As a result, it becomes possible to estimate the good timing for the collection of the proceeds, and therefore to perform the collection of the proceeds more effectively, comparing with the collection of the proceeds under the predetermined collection schedule. Since the goods sales management system of the present invention makes the time managed in the goods vending machine coincide with the time controlled by the vending machine management apparatus, the transmission time of the sales information transmitted from the goods vending machine is precisely controlled. Therefore, in the case that the slightly different time for transmitting the sales information from the plurality of the goods vending machines to the vending machine management apparatus is set, the situation that the sales information is transmitted simultaneously can be prevented due to the deviation of these set time in advance.

According to the goods sales management method of the present invention defined by claim 6, a sales price of goods is set by the vending machine management apparatus in accordance with the sales information of goods, which is transmitted from the goods vending machine, and then the set sales price is transmitted from the vending machine management apparatus to the goods vending machine as a transmitter of the sales information. A sales price managed by the vending machine is changed to the set sales price transmitted from the vending machine management apparatus, and then a change-completion notice of the sales price is transmitted from the goods vending machine to the vending machine management apparatus. Time information managed by the vending machine management apparatus is transmitted from the vending machine management apparatus to the goods vending machine as a transmitter of the change-completion notice when receiving it, and then time, which is managed by the goods vending machine, is adjusted to coincide with the time information transmitted from the vending machine management apparatus. Thereby, the sales price of goods sold by the goods vending machine can be freely and adequately set in consideration of the actual sales information. That is, the sales price of goods can be set in consideration of, for example, poor sales or a deterioration of the goods. Therefore, it is possible to set the sales price so as to meet customer's demands. Since the goods sales management system of the present invention makes the time managed in the goods vending machine coincide with the time controlled by the vending machine management apparatus, the sales time in the sales information can be precisely recognized. In other words, the dales condition of goods can be grasped more precisely. As a result, the sales price of goods can be adequately controlled along with the sales condition.

According to the goods sales management system or method of the present invention defined by claim 7 or 8, if there is a time difference between each time of places where the vending machine management apparatus and the goods vending machine are arranged, respectively, the time information transmitted from the vending machine management apparatus to the goods vending machine is controlled to include the time difference. That is, the sales time in the sales information transmitted from the goods vending machine can be set to time corresponding to the installed spot of goods vending machine. Therefore, it can be clearly grasped whether the time when the goods was sold is in the morning or in the afternoon, more specifically, the sales condition of goods can be grasped more precisely.

BEST MODE FOR CARRYING OUT THE PRESENT INVENTION

Hereinafter, embodiments of the present invention will be described with reference to the accompanying drawings. According to the embodiments of a goods sales management system of the present invention, a description will be given of a goods vending machine provided with a plurality of retail vending units including a plurality of capsules containing goods therein. Initially, before explaining a goods sales management method according to the present invention, an explanation is provided for a goods sales management system, to which the goods sales management method is applied.

Figure 1:
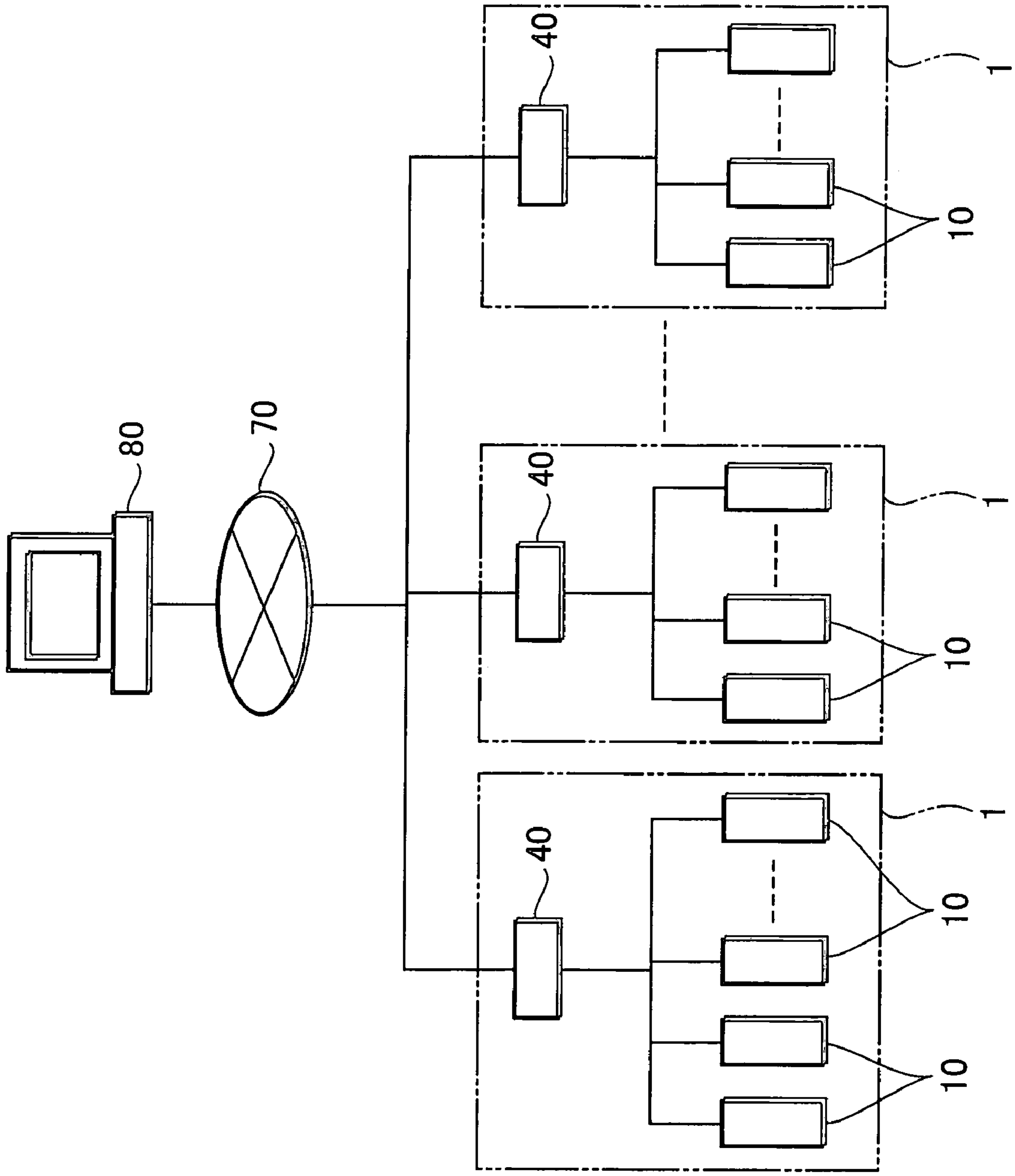
FIG. 1 illustrates a goods sales management system according to an embodiment of the present invention.

The goods sales management system of the present invention, as shown in FIG. 1, comprises: a plurality of goods vending machines 1 each having a plurality of retail vending units 10; and a vending machine management apparatus 80 connected to each of the plurality of the goods vending machines 1 via a communication line 70 for controlling the goods vending machine 1.

The communication line 70 connected between the plurality of the goods vending machines 1 and the vending machine management apparatus 80 can be either one of wire communications or radio networks, for example, public line networks, local area networks (LAN), Personal Handy-phone Systems (PHS), cellular telephone networks, or radio communication networks.

Figure 2:
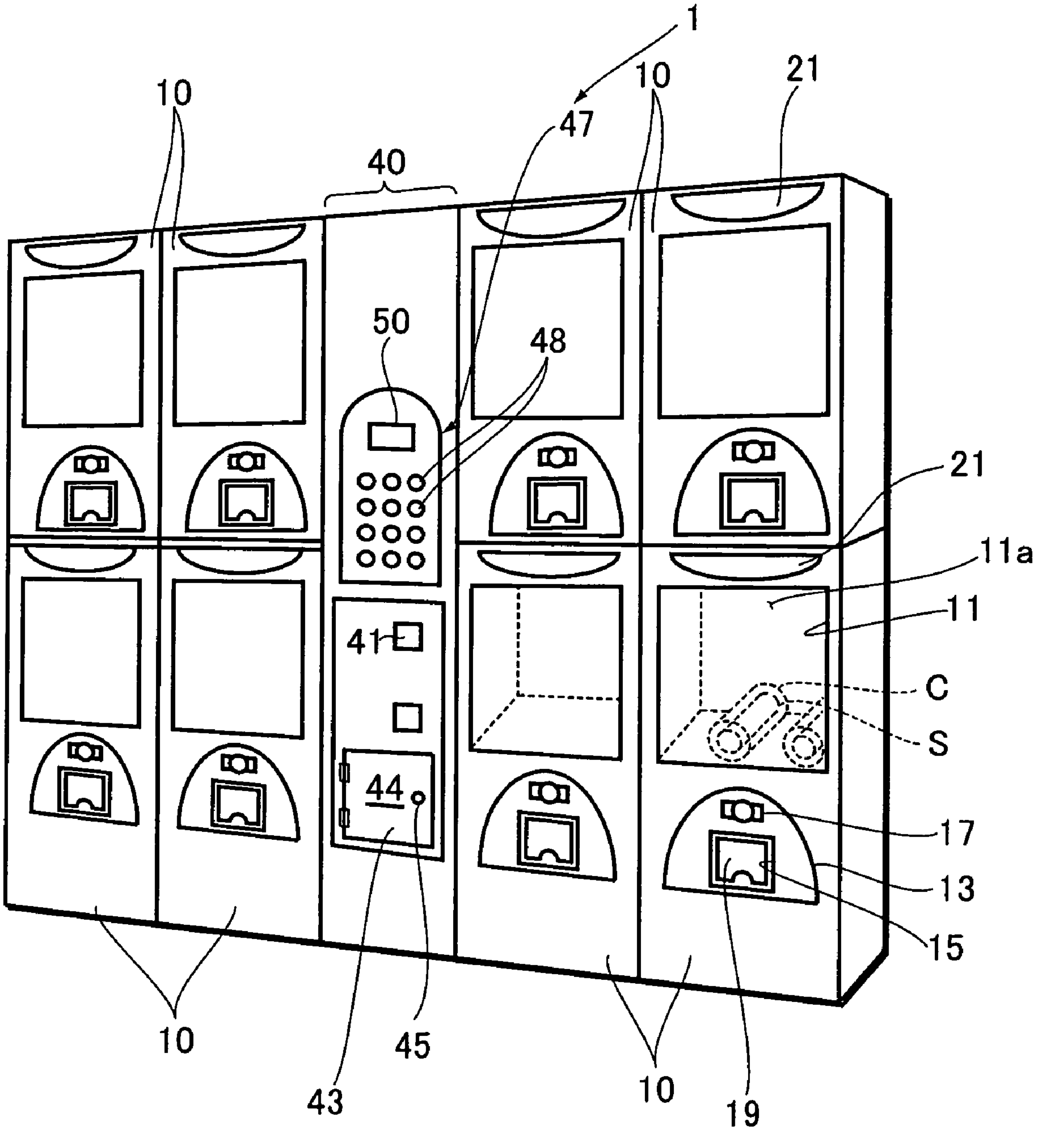
FIG. 2 is a perspective view of a retail vending machine provided in the goods sales management system shown in FIG. 1.

The goods vending machine 1, as shown in FIG. 2, comprises: a sales management portion 40 provided in the intermediate portion thereof for controlling a sales management to eject the goods in response to a selecting operation of desired goods after receiving money for the goods; and eight retail vending units 10 provided on both sides of the sales management portion 40. The retail vending units 10 of each side are arranged in two rows each on upper and lower shelves. The number of the retail vending units 10 to form the goods vending machine 1 is not limited to eight. There is no specific limitation as long as there are two or more retail vending units 10.

The retail vending unit 10 has a rectangular parallelepiped shape, and has a container 11 at the upper portion for containing the plurality of the goods and an ejection port 13 provided at the lower portion under the container 11 for ejecting the goods S contained in the container 11. A front portion 11*a* of the container 11 is formed of a transparent panel, and the container 11 is box-shaped. Accordingly, the inside of the container 11 can be seen from a front position of the retail vending unit 10 via the front portion 11*a*. The goods S contained in the container 11 is dividable and contained in a capsule C formed of transparent materials. Accordingly, a customer (not shown) can see the goods S in the capsule C through the front portion 11*a*. The goods S are toys, confectionery, dolls, or the like, which are containable in the capsule C. Furthermore, the goods S maybe foods, flowers or the like, which require a quality control.

The ejection port 13 includes a goods take-out port 15 provided at the lower position under the container 11, which is open to the front, and a handle 17 to be rotated when the goods S contained in the container 11 is delivered therefrom. A rotational movement of the handle 17 is restricted and allowed by a lock mechanism (not shown), a more detailed description on which is given below. The capsule C contained in the container 11 can be delivered to a communicating passage (not shown) communicating with the goods take-out port 15 by rotating the handle 17. Further, a rotation detecting switch (not shown) is provided with the handle 17 for sensing the rotational movement of the handle 17. That is, the rotational movement of the handle 17 to be detected represents that the capsule C (goods) contained in the container 11 is taken out from the container 11.

A lid portion 19 is provided at the goods take-out port 15 so as to be freely swung up and down in a vertical direction by pivoting an upper position thereof. During non-operation of the lid portion 19, the goods take-out port 15 is covered with the lid portion 19 extending downwardly. When the lid portion 19 is pulled up, the goods take-out port 15 is exposed to be open, and it becomes possible to take out the capsule C (goods S). There provided a selection lamp 21 on a front surface of the retail vending unit 10 at an upper position above the container 11. The detailed explanation about the operational movement of the selection lamp 21 will be described hereinafter. When the retail vending unit 10 containing the desired goods is selected by the sales management portion 40, the selection lamp 21 of the selected retail vending unit 10 is flashed.

The sales management portion 40 has a money throw-in port 41 for receiving money for the goods S, a safe 43 for containing the money (coins) thrown from the money throw-in port 41, a selection switch 47 for operating a selection of the retail vending unit 10 storing the goods which is desired to be bought by the customer, and a price display unit 50 for indicating the amount of money thrown through the money throw-in port 41. The money throw-in port 41 is configured to receive the coins, but may be configured to receive paper money. The safe 43 is provide with a front door 44 at a front position thereof for being swingably open to front and rear directions, and the front door 44 has a key 45 attached therein. The selection switch 47 is provided with a plurality of operation buttons 48 to be pushed, and each button 48 has a stamped natural number (1, 2, 3, . . . , 9) which is different from each other. On the other hand, each of the retail vending units 10 is given a different natural number, and the numbers given to the retail vending units 10, not shown in the drawing, are shown in the vicinity of the selection switch 47, the retail vending units 10, or the like, to be easily recognized by the customers. Therefore, as the customer pushes the operation buttons 48 corresponding to the number of the retail vending unit 10 containing desired goods, it is possible to designate the retail vending unit 10 storing the goods which the customer wants to buy.

Figure 3:
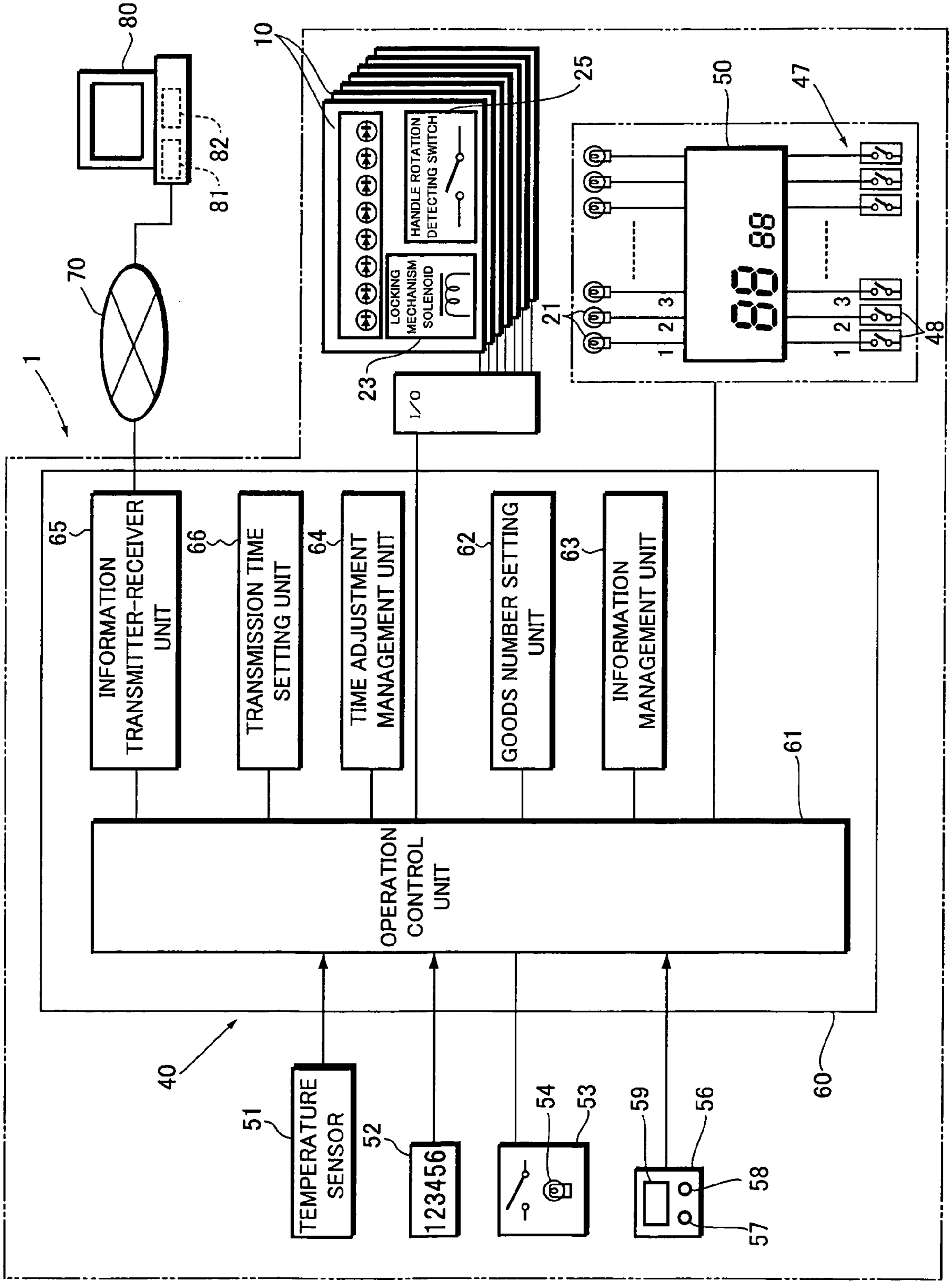
FIG. 3 is a block diagram of the retail vending machine.

The sales management portion 40, as shown in FIG. 3, is provided with a temperature sensor 51 for sensing a temperature in the container 11, a coin counter 52 for counting the number of the coins thrown from the money throw-in port 41, a coin selector 53 for detecting an improper coin thrown into the money throw-in port 41 or for warning when the safe 43 is full of the coins, a goods number setting switch 56 for setting a maximum number of the goods storable in the container 11 of the retail vending unit 10 in accordance with a capacity thereof, and a controller 60 described below in details. A selector lamp 54 provided in the coin selector 53 lights up when an unusable coin is thrown into the money throw-in port 41 or when the safe 43 is full of the coins. The goods number setting switch 56 has a setting button 57 for selecting a maximum number of the goods stored in each container 11 of the plurality of the retail vending units 10, a reset button 58 for resetting the number of the goods delivered from the container 11 to zero, and a setting display portion 59 for displaying the selected and set numbers. A humidity sensor may be provided in the sales management portion 40 instead of the temperature sensor 51, or together with the temperature sensor 51. The sales management portion 40 contains the temperature sensor 51, the coin counter 52, the coin selector 53, the goods number setting switch 56 and the controller 60.

The controller 60 exchanges the information with the vending machine management apparatus 80 through the communication line 70, and has a function to deliver the required goods from the retail vending unit 10. The controller 60 is provided with an operation control unit 61, a goods number setting unit 62, an information management unit 63, a time adjustment management unit 64, an information transmitter-receiver unit 65 and a transmission time setting unit 66. The goods number setting unit 62 is a memory apparatus for setting a selected number selected by the setting button 57 of the goods number setting switch 56. The time adjustment management unit 64 controls the time, and also functions to make the managed time coincide with the time transmitted from the vending machine management apparatus 80. Supposing the case where there is the time difference between each place in which the vending machine management apparatus 80 and the goods vending machines 1 are installed respectively, the time adjustment management unit 64 makes the managed time of the goods vending machine 1 correspond to the time including the time difference from the vending machine management apparatus 80. Further, the time information controlled by the time adjustment management unit 64 may include the time only, or both the time and the date.

The information transmitter-receiver unit 65 transmits a terminal number assigned to each goods vending machine 1 to the vending machine management apparatus 80 by a dialing transmission through the communication line 70, and although the detailed explanation is given hereinafter, the information transmitter-receiver unit 65 transmits the sales information managed by the information management unit 63 to the vending machine management apparatus 80 at the time set by the transmission time setting unit 66. The information transmitter-receiver unit 65 requests to transmit the time information controlled by the vending machine management apparatus 80 when receiving a response signal indicating that the vending machine management apparatus 80 has received the sales information. The terminal number may be assigned from the vending machine management apparatus 80 through the communication line 70 after setting the goods vending machine 1 at sales sites, or be assigned individually in advance before setting the goods vending machine 1.

The transmission time setting unit 66 sets a time when each 20 , sales information of the goods vending machine 1 is transmitted from the goods vending machine 1 to the vending machine management apparatus 80 (hereinafter referred to as a transmission time). The transmission time is transmitted to each goods vending machine 1 together with the terminal number given to the goods vending machine 1 by the vending machine management apparatus 80. The transmission time may be set in the transmission time setting unit 66 of the goods vending machine 1 at the time of manufacturing the goods vending machine 1.

The information management unit 63 manages the sales information including the goods S delivered from the container 11 of the goods vending machine 1, the number of the sold goods S, the amount of proceeds, a sales time, a sales price and time reset by the reset button 58. Although the detailed explanation is given hereinafter, the information management unit 63 changes the sales price controlled by itself to the one set by the vending machine management apparatus 80. The number of the sold goods S is calculated from the number of the goods S, as delivered after the resetting operation is performed by the reset button 58 of the goods number setting switch 56. The amount of the proceeds is calculated by multiplying the number of the sold goods S with the sales price. The sales time is specified by managing the time when the handle rotation detecting switch 25 outputs an ON signal indicating the rotation of the handle 17.

The operation control unit 61 controls to display a price on the price display unit 50 in accordance with the numbers calculated by the coin counter 52 and to flash or turn on a light of the selection lamp 21 of the retail vending unit 10 in response to pushing operations of the operation button 48 of the goods selection operation switch 47. Furthermore, the operation control unit 61 releases a locking condition of the handle 17 by controlling the electric supply to a solenoid 23 which constitutes a part of the locking mechanism included in the retail vending unit 10 and allows the rotational movement of the handle 17 to eject the goods when it is determined that a desired retail vending unit 10 is selected by the goods selection operation switch 47, and the money thrown in exceeds the price of the goods contained in the selected retail vending unit 10.

The operation control unit 61 further makes the information management unit 63 count how many goods have been delivered for each retail vending unit 10 since the reset button 58 of the goods number setting switch 56 reset the number of the goods. In addition, the operation control unit 61 controls the information management unit 63 to memorize the time when the retail vending unit 10 is reset by the reset button 58 of the goods number setting switch 56, and also controls the goods number setting unit 62 to set the selected number selected by the setting button 57 of the goods number setting switch 56 for each retail vending unit 10.

Furthermore, the operation control unit 61 actuates the time adjustment management unit 64 to make the time controlled by the time adjustment management unit 64 correspond to the time controlled by the vending machine management apparatus 80 when the information transmitter-receiver unit 65 receives the time information controlled by the vending machine management apparatus 80. The operation control unit 61 actuates the information transmitter-receiver unit 65 to transmit the sales information managed by the information management unit 63, the time information managed by the time adjustment management unit 64 and an internal temperature information of the container 11 detected by the temperature sensor 51 to the vending machine management apparatus 80 at the time set by the transmission time setting unit 66. In addition, the temperature information may contain at least the temperature information of the temperature detected by the temperature sensor 51 just before the sales information is transmitted to the vending machine management apparatus 80, the temperature at each time when the goods are sold or the temperature at each time when a predetermined time elapses after storing the goods in the container 11. As explained above, the transmission of the sales information to the vending machine management apparatus 80 starts by a call-up from the goods vending machine 1.

The operation control unit 61 actuates the information management unit 63 to change the sales price controlled by itself to the one transmitted from the vending machine management apparatus 80 when the operation control unit 61 receives the sales information on the sales price of the goods from the vending machine management apparatus 80.

On the other hand, the vending machine management apparatus 80 connected to the goods vending machine 1 through the communication line 70 memorizes the sales information transmitted from the goods vending machine 1 and the time information managed by the goods vending machine 1 in an internal memory apparatus thereof, and displays the information when necessary. The vending machine management apparatus 80 is provided with a response unit 81 for transmitting a response signal to the goods vending machine 1 when receiving the sales information from the goods vending machine 1, and a price setting unit 82 for setting each sales price of the goods sold by the respective goods vending machines 1. The vending machine management apparatus 80 controls the time, and transmits the time information controlled by itself to the respective goods vending machine 1 in response to a demand of the time information therefrom. The time information controlled by the vending machine management apparatus 80 is not limited to the time, but may include both the time and the date.

The explanation about a goods sales management method according to the above mentioned goods sales management system is given as follows. The goods vending machine 1 is first set at an initial condition. That is, a manager (not shown) of the goods vending machine 1 stores the goods in each container 11 of the plurality of the retail vending units 10 so as to fill up the container 11. As shown in FIG. 3, the manager sets a maximum number of the goods to be stored in each container 11 of the plurality of the retail vending units 10 by selecting the setting button 57 of the goods number setting switch 56, and sets the number of the goods delivered from the container 11 to zero by operating the reset button 58. After the reset button 58 is pushed, a goods number setting switch 56 provided with the reset button 58 may, through the operation control unit 61, displays the number of the remaining goods on the setting display portion 59 after the goods are delivered from the container 11, and the number of the remaining goods is recorded in the goods number setting unit 62.

The customer puts the money into the money throw-in port 41 shown in FIG. 2, and then pushes the operation buttons 48 of the goods selection operation switch 47 in order to select the retail vending unit 10 containing the desired goods therein. When the money is thrown into the money throw-in port 41, the coin counter 52 counts the number of the coins. The money amount in accordance with the counted number is displayed on the price display unit 50 by the operation control unit 61 of the controller 60. When the operation button 48 is pushed, the selecting lamp 21 of the retail vending unit 10 corresponding to the pushed operation button 48 is flashed. As a result, the customer can make certain whether the operation button 48 is correctly selected by visually checking the flashing selecting lamp 21 of the retail vending unit 10.

When the money thrown in is more than the price of the desired goods, the operation control-unit 61 releases the locked condition of the handle 17 by means of the lock mechanism by controlling the electric supply to the solenoid 23. Then, the customer rotates the handle 17 to get the desired goods delivered from the container 11. The information management unit 63 of the controller 60 adds the number of the delivered goods by one after a handle rotation detecting switch 25 is turned on by rotating the handle 17. In this way, the goods is purchased and then delivered from the container 11. At this moment, the information management unit 63 counts the number of goods delivered from the retail vending unit 10 for each retail vending unit 10 in such a way that the number increases to 1, 2, 3, . . . . The information management unit 63 records the time managed by the time adjustment management unit 64 together with the number of the delivered goods in each combination, calculates the proceeds according to the number of the delivered goods, and manages the sale information including the delivered goods, the number of the delivered goods, the paid money, and the time when the goods were sold, each time when the handle rotation detecting switch 25 is turned on by rotating the handle 17.

Figure 4:
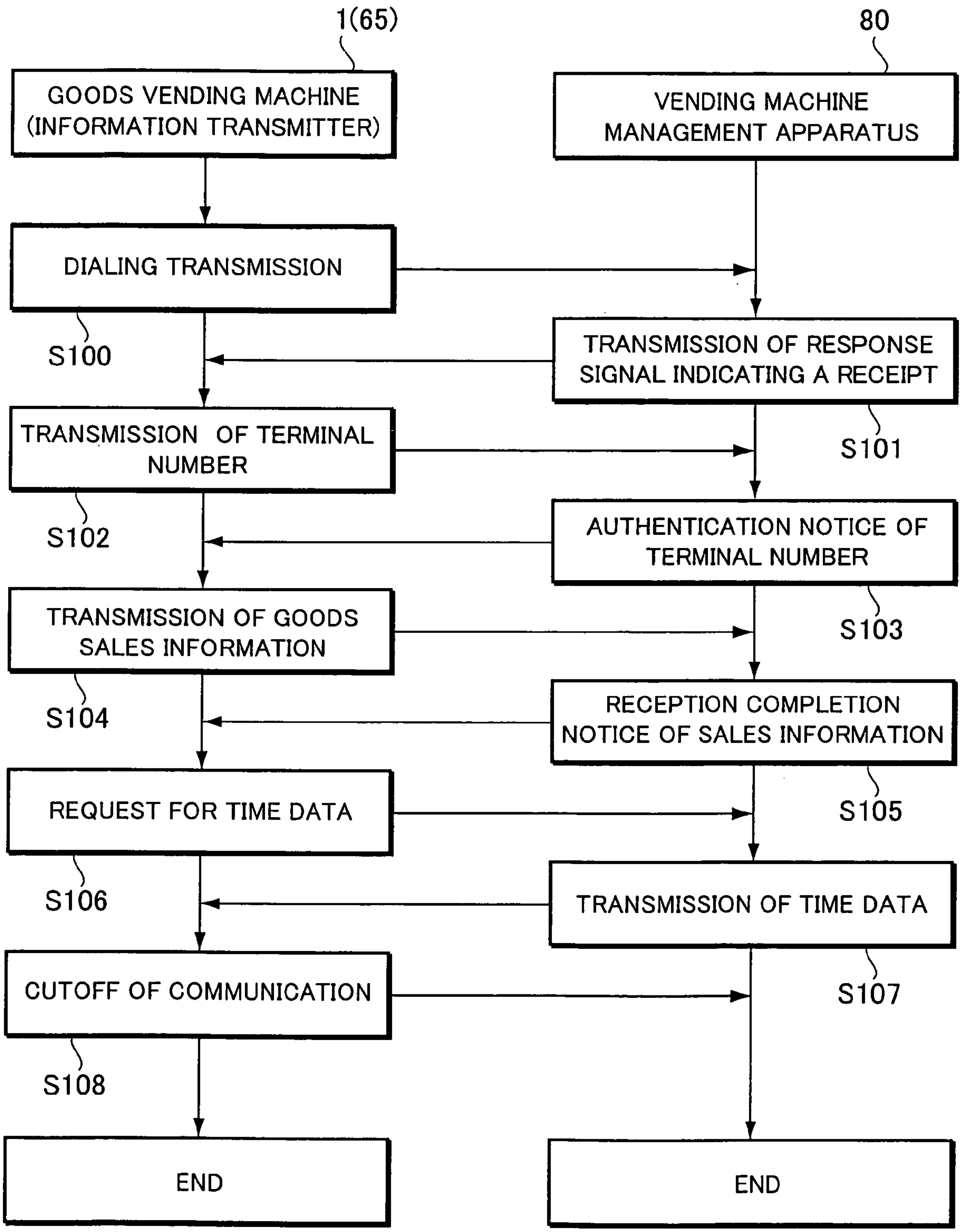
FIG. 4 is a flowchart showing a goods sales management method according to an embodiment of the present invention.

At the time set by the transmission time setting unit 66, the operation control unit 61 actuates the information transmitter-receiver unit 65 to transmit the sales information managed by the information management unit 63 to the vending machine management apparatus 80. More specifically, when receiving a command to transmit the sales information, the information transmitter-receiver unit 65 makes a dialing transmission to the vending machine management apparatus 80 through the communication line 70 as shown in FIG. 4 (STEP 100). After the vending machine management apparatus 80 is connected with the goods vending machine 1 via the communication line 70, the vending machine management apparatus 80 transmits the response signal indicating a receipt of communication to the goods vending machine 1 (STEP 101). When receiving the response signal indicating the receipt thereof, the information transmitter-receiver unit 65 of the goods vending machine 1 transmits data of a terminal number assigned to the goods vending machine 1 to the vending machine management apparatus 80 (STEP 102). In addition, the terminal number is preferably encrypted for the transmission because a reliability of the information transmitted to the vending machine management apparatus 80 is extremely damaged if the terminal number is known and changed by the third party. After receiving the data of the terminal number, the vending machine management apparatus 80 verifies the terminal number, and sends an authentication notice thereof to the goods vending machine 1 after the authentication of the terminal number (STEP 103).

After receiving the authentication notice of the terminal number from the vending machine management apparatus 80, the goods vending machine 1 transmits the sales information of the goods to the vending machine management apparatus 80 (STEP 104). When the sales information of the goods is transmitted to the vending machine management apparatus 80, the time information controlled by the time adjustment management unit 64 and the temperature information detected by the temperature sensor 51 as shown in FIG. 3 are transmitted to the vending machine management apparatus 80 together with the sales information. Accordingly, it is possible to grasp the sales condition of the goods by the number of the sold goods and the time when the goods were sold. It is also possible to control the quality maintaining period by knowing how long the goods have been stored before the goods are sold, and to control the quality of the goods with the temperature information in the container 11. As a result, the goods requiring the quality control also can be stored in the goods vending machine 1, so that the range of choices for the goods to be stored can be increased. Further, as the sales price and time are included in the sales information, it is possible to estimate the good timing for the collection of the proceeds, and therefore perform the collection of the proceeds effectively. According to the present invention, the time managed by the goods vending machine 1 coincides with the time controlled by the vending machine management apparatus 80, and thus it is possible to accurately keep the time when the goods were sold and the time when the sales information is transmitted for the vending machine management apparatus 80. Therefore, when the slightly different time for transmitting the sales information from the plurality of the goods vending machines 1 to the vending machine management apparatus 80 is set, the situation that the sales information is transmitted simultaneously can be avoided due to the deviation of these set time.

The vending machine management apparatus 80 actuates the response unit 81 as shown in FIG. 3 to transmit a notice of the completion of the reception (the response signal) to the goods vending machine 1 after receiving the sales information of the goods (STEP 105). The goods vending machine 1 receives the notice of the completion of the reception, and then requests the data of the time information controlled by the vending machine management apparatus 80 (STEP 106). Next, the vending machine management apparatus 80 transmits the time information controlled by itself to the goods vending machine 1 in response to the request of the data (STEP 107). The goods vending machine 1 receiving the time information actuates the time adjustment management unit 64 of the goods vending machine 1, shown in FIG. 3, to make the time managed by itself coincide with the time included in the received time information. Accordingly, the time managed by the goods vending machine 1 becomes approximately equal to the time controlled by the vending machine management apparatus 80, so that the sales time included in the sales information becomes more accurate, and therefore, the sales condition of the goods can be grasped more precisely.

After receiving a clock data from the vending machine management apparatus 80, the goods vending machine 1 cuts off the communication with the vending machine management apparatus 80 (STEP 108). In this way, when the goods vending machine 1 receives the notice of the completion indicating that the sale information has been received in the communication with the vending machine management apparatus 80, the goods vending machine 1 cuts off the communication with the vending machine management apparatus 80 upon the condition that the goods vending machine 1 receives the time information controlled by the vending machine management apparatus 80. Thus, the goods vending machine 1 can accurately recognize that the sales information is transmitted to the vending machine management apparatus 80, and also the goods vending machine 1 can shorten the transmitting time of the sales information to the vending machine management apparatus 80.

Figure 5:
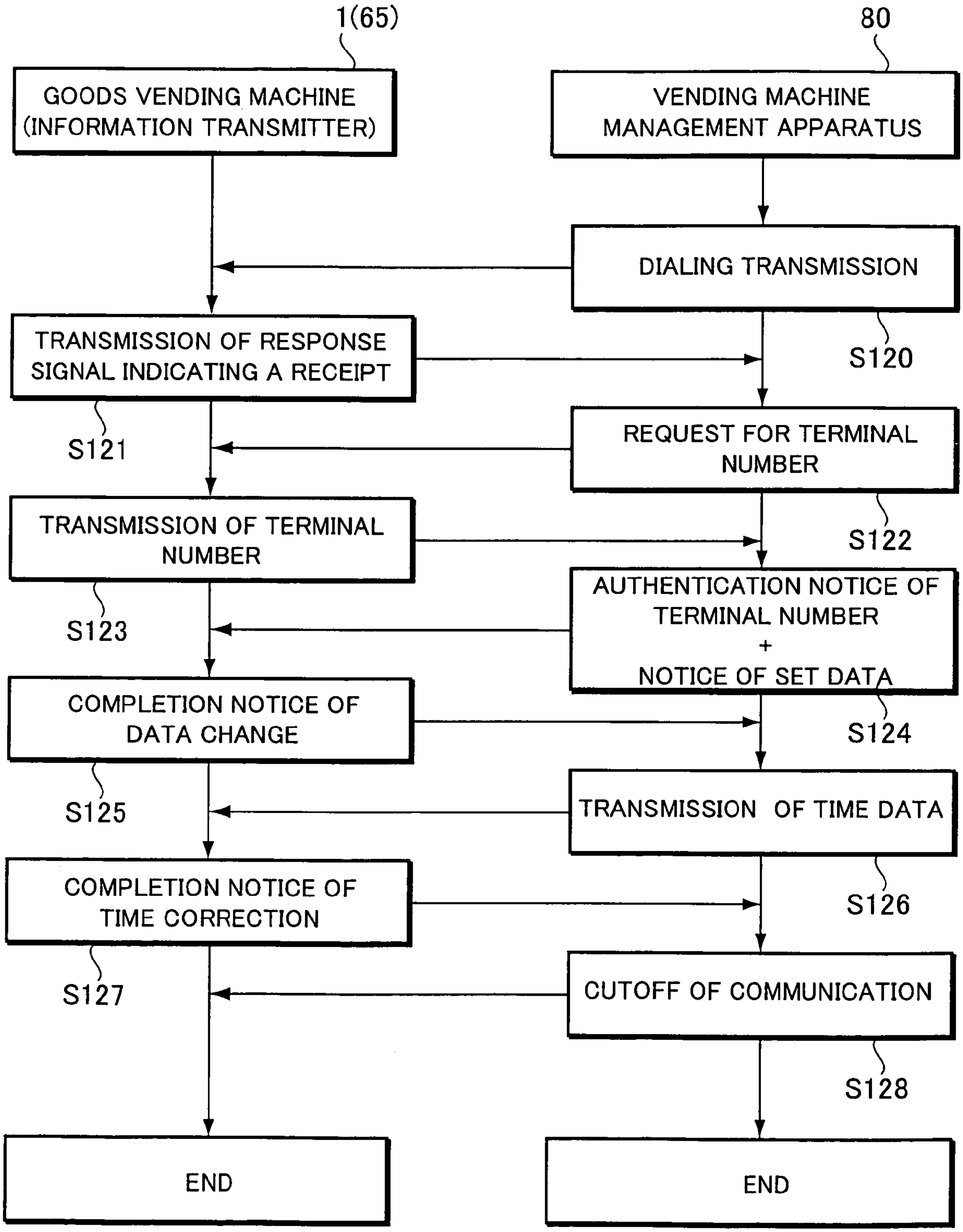
FIG. 5 is another flowchart showing the goods sales management method according to the embodiment of the present invention.

Next, the following is the explanation about the case where the sales price of the good is changed. When the sales price of the goods is changed, as shown in FIG. 5, the vending machine management apparatus 80 communicates by dialing through the communication line 70 to the goods vending machine 1 selling the goods, the price of which should be changed (STEP 120). That is, changing the sales price is done by a dial call-up of the vending machine management apparatus 80. When the vending machine management apparatus 80 is connected to the goods vending machine 1 via the communication line 70, the goods vending machine 1 transmits a response signal of receipt to the vending machine management apparatus 80 (STEP 121). Further, if the vending machine management apparatus 80 is connected to the goods vending machine 1 while the goods vending machine 1 is selling the goods, the goods vending machine 1 may transmit a signal indicating that the goods vending machine 1 is now selling the goods to the vending machine management apparatus 80, and then the vending machine management apparatus 80 communicates to the goods vending machine 1 by a redialing call-up again after the predetermined time has passed.

The vending machine management apparatus 80 receives the response signal of receipt from the goods vending machine 1, and then requests transmission of the terminal number assigned to each goods vending machine 1 (STEP 122). Upon receiving a request notice of the terminal number, the goods vending machine 1 transmits the terminal number of itself to the vending machine management apparatus 80 (STEP 123). Preferably, the terminal number is encrypted for the transmission as described above.

When the vending machine management apparatus 80 receives the data of the terminal number, the vending machine management apparatus 80 transmits the authentication notice of the terminal number and renewal data of the sales price to the goods vending machine 1 after confirming the terminal number for the authentication (STEP 124). The sales price is determined in accordance with the previous sales information, in which the sales price may be decided by a manager or may automatically be decided by a program for setting the sales price provided in the vending machine management apparatus 80.

When the goods vending machine 1 receives the renewal data of the sales price, the information management unit 63 of the goods vending machine 1 changes the sales prices of the goods managed by itself to the sales price transmitted from the vending machine management apparatus 80 in accordance with a command from the operation control unit 61 as shown in FIG. 3. As a result, the goods are sold by the changed sales price from the time when the sales price is changed. As the sales price of the goods can be freely changed in accordance with the sales information of the goods, the sales price of the goods can be set in consideration of, for example, poor sales or a deterioration of the goods. Therefore, it is possible to set the sales price to meet customer's demands, and improve the sales condition of the goods.

On receiving the notice of the completion in changing the sales price of the goods from the goods vending machine 1 (STEP 125), the vending machine management apparatus 80 transmits the time information controlled by itself to the goods vending machine 1 (STEP 126). The goods vending machine 1, after receiving the time information, actuates the time adjustment management unit 64 as shown in FIG. 3 to make the time managed by itself coincide with the time transmitted from the vending machine management apparatus 80. The goods vending machine 1 transmits the notice indicating that the time has been corrected to the vending machine management apparatus 80 (STEP 127). When receiving the notice of the correction of the time from the goods vending machine 1, the vending machine management apparatus 80 cuts off the communication with the goods vending machine 1 (STEP 128).

As mentioned above, the time managed by the goods vending machine 1 coincide with the time controlled by the vending machine management apparatus 80 after the change of the sales price so that the sales time included in the sales information can be kept accurate, and thus the sales condition of the goods can be more accurately grasped. As a result, the sales price of the goods can be set at more appropriate price in accordance with the sales condition.

According to the goods sales management system and the goods sales management method of the present invention, the sales condition of the goods can be more accurately grasped and the good quality control of the goods can be accomplished with the sales information including the sales time and the temperature information in the container 11. Therefore, the quality of the goods contained in the goods vending machine 1 can be easily controlled, and the sales price can be easily changed even if the goods vending machines 1 are installed in a wide range of locations.

INDUSTRIAL APPLICABILITY

The present invention is also applicable to ordinary automatic vending machines which sell beverages such as a variety of canned drinks, books or magazines, or the like.

The invention claimed is:

1. A goods sales management system, comprising:

a plurality of vending machines, the vending machines comprising a container for storing a plurality of goods;

price setting means for setting a sales price of each of the plurality of goods sold by each of said plurality of vending machines; and a vending machine management apparatus for controlling the plurality of vending machines, the vending machine management apparatus being associated with each of the plurality of vending machines, wherein said vending machine management apparatus is configured to manage time as time information and to communicate the time information to each of the plurality of vending machines, wherein each of said vending machines comprises:

time adjustment management means configured to manage time as managed time information by making the managed time information coincide with said time information from the vending machine management apparatus;

information management means for managing sales information, the sales information including at least one of a kind and number of goods as delivered from the container, a sales price, and a sales time;

transmission time setting means for setting a transmission time when said sales information is transmitted to said vending machine management apparatus;

detecting means for detecting an item quality of at least one of the plurality of goods, said item quality including at least one of a temperature and a humidity in said container of said vending machine; and information transmitting/receiving means for transmitting said sales information managed by said information management means to said vending machine management apparatus at said set transmission time, wherein at least one of the plurality of vending machines transmits said time information and said sales information to said vending machine management apparatus through said information transmitting/receiving means, wherein said vending machine management apparatus transmits said time information managed thereby to said one of the plurality of the vending machines when said sales information is received, wherein said time adjustment management means of said one of the plurality of the vending machines makes said time information managed thereby coincide with said time information transmitted from said vending machine management apparatus, wherein said sales information transmitted to said vending machine management apparatus includes information of said temperature or humidity detected just before said transmission of said sales information, and wherein the price setting means sets the sales price of each good based on the sales information.

2. The goods sales management system according to claim 1, wherein the vending machine management apparatus is associated with each of the plurality of vending machines through a communication line.

3. The goods sales management system according to claim 1, wherein the vending machine management apparatus determines a price of a good based on an amount of time a respective good has been in a respective vending machine.

4. The good sales management system according to claim 3, wherein the price setting means determines the price of at least one of the plurality of goods based on an expected shelf life of the at least one of the plurality of goods.

5. The goods sales management system according to claim 1, wherein said time information transmitted comprises a time difference between each time of places where said vending machine management apparatus and said goods vending machine are arranged, respectively.

6. The goods sales management system according to claim 1, wherein said containers are configured to be capable of separately containing a plurality of kinds of goods every container, wherein each of said vending machine further comprises a sales management unit for delivering the goods in accordance with a selecting operation of desired kinds of goods selected by a customer after receiving payment.

7. The goods sales management system according to claim 6, wherein said time information transmitted from said vending machine management apparatus to said vending machine further comprises a time difference between a time where said vending machine management apparatus and a time of where said vending machine are arranged, respectively.

8. The goods sales management system according to claim 1, wherein said vending machine management apparatus transmits information of said sales price controlled by said price setting means to said vending machines when said sales information is received, and wherein said information management means of said vending machine changes said sales price managed by itself to said sales price controlled by said price setting means.

9. The goods sales management system according to claim 8, wherein said time information transmitted from said vending machine management apparatus to said vending machine, further comprises a time difference between a time where said vending machine management apparatus and a time of where said vending machine are arranged, respectively.

10. The goods sales management system according to claim 8, wherein said container of said vending machine comprises a plurality of containers configured to separately contain a plurality of kinds of goods, and wherein each of said vending machine further comprises a sales management unit for delivering the goods in accordance with a selecting operation of desired kinds of goods after receiving payment.

11. The goods sales management system according to claim 1, wherein each of said vending machines further comprises:

detecting means for detecting said quality of at least one of the plurality of goods in said container of said vending machine, said goods quality being affected by at least one of the detected temperature and humidity, wherein said sales information transmitted by said vending machine management apparatus includes information of said temperature or humidity detected just before said transmission of said sales information.

12. The goods sales management system according to claim 11, said vending machine management apparatus further comprising:

price setting means for setting a sales price of each one of the plurality of goods sold by each of said plurality of vending machines, wherein said vending machine management apparatus transmits information of said sales price controlled by said price setting means to said vending machine when said sales information is being received, and wherein said information management means of said vending machine changes said sales price to said controlled sales price.

13. The goods sales management system according to claim 11, wherein said containers of said vending machine are configured to be capable of separately containing a plurality of kinds of goods in every container, and wherein each of said vending machine further comprises a sales management unit for delivering the plurality of kinds of goods in accordance with a selecting operation of desired kinds of goods after receiving payment.

14. The goods sales management system according to claim 11, wherein said time information transmitted from said vending machine management apparatus to said vending machine, further comprises a time difference between each time of places where said vending machine management apparatus and said vending machine are arranged, respectively.

15. The goods sales management system according to claim 11, wherein the price setting means determines the price of at least one of the plurality of goods in a respective vending machine based on a quality control determination, the quality control determinate being based on at least one of the detected temperature and humidity at the respective vending machine.

16. A goods sales management method, said method comprising:

transmitting sales information including at least one of a kind and number of goods as delivered from the container, a sales price, and a sales time, from a vending machine to a vending machine management apparatus at a predetermined transmitting time;

transmitting time information from said vending machine management apparatus to said vending machine when receiving said sales information;

coordinating time with said time information transmitted from said vending machine management apparatus;

detecting an environmental condition at the vending machine apparatus; and determining a price of a good in a respective vending machine based on a quality control determination, the quality control determination being based on a time that said good has been in the vending machine apparatus and on the detected environmental condition at the respective vending machine.

17. The goods sales management method according to claim 16, wherein said time information further comprises, a time difference between each time of places where said vending machine management apparatus and said vending machine are arranged, respectively.

18. A goods sales management method, said method comprising:

detecting an environmental condition at the vending machine apparatus;

incorporating the environmental condition into sales information of goods;

setting a sales price of goods in accordance with said sales information of goods;

transmitting said set sales price from a vending machine management apparatus to one of a plurality of vending machines;

changing a sales price managed by said vending machine to said set sales price transmitted from said vending machine management apparatus;

transmitting a change-completion notice of said sales price from said vending machine to said vending machine management apparatus;

transmitting time information managed by said vending machine management apparatus from said vending machine management apparatus to said vending machine when said change-completion notice is received; and coordinating time managed by said vending machine with said time information transmitted from said vending machine management apparatus.

19. The goods sales management method according to claim 18, wherein said time information transmitted from said vending machine management apparatus to said vending machine, further comprises a time difference between a time of where said vending machine management apparatus and a time of where said vending machine are arranged, respectively.

* * * * *